United States Patent Office 3,475,428
Patented Oct. 28, 1969

3,475,428
1-TERTIARY AMINO-1-TRICHLORO METHYL CYCLOALKANES
Gerhard H. Alt, Creve Coeur, Mo., assignor to Monsanto Company, St. Louis, Mo., a corporation of Delaware
No Drawing. Filed May 23, 1966, Ser. No. 551,914
Int. Cl. C07d 87/30, 27/04, 29/14
U.S. Cl. 260—247
9 Claims

ABSTRACT OF THE DISCLOSURE

Compounds of the formula

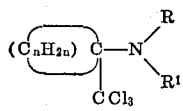

wherein R and $R^1$ are each of alkyl having a maximum of 12 carbon atoms or together form a divalent group selected from the group consisting of $-CH_2CH_2CH_2-$, $-CH_2CH_2OCH_2CH_2-$, $-CH_2CH_2CH_2CH_2-$, $-CH_2(CH_2)_3CH_2-$ and $-CH_2(CH_2)_4CH_2-$; and $n$ is an integer of from 3 to 10 thus forming an alicyclic ring which may have a maximum of three methyl substituents.

These compounds are useful as intermediates for the preparation of compounds useful as feed additives.

---

This invention relates to new compounds and a novel method of synthesis. The new compounds are intermediates for the preparation of useful additives for animal feeds by the procedure described and claimed in copending application Ser. No. 551,929, filed May 23, 1966 by Gerhard H. Alt.

The new compounds have the formula

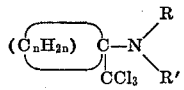

wherein $n$ is an integer of from three to ten providing a hydrocarbon ring of the class consisting of alicyclic rings and said alicyclic rings having up to three methyl substituents; and wherein R and R' are selected from the class consisting of alkyl of up to and including 12 carbon atoms and alkyl moieties such that R and R' together form a divalent group of the class consisting of $-CH_2CH_2CH_2-$, $-CH_2CH_2OCH_2CH_2-$, $-CH_2CH_2CH_2CH_2-$, $-CH_2(CH_2)_3CH_2-$ and $-CH_2(CH_2)_4CH_2-$.

The novel reaction proceeds in accordance with the equation:

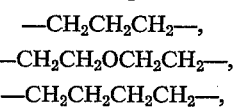

The new compounds are prepared by reacting suitable enamines with trichloroacetic acid. The reaction is conducted in an aromatic hydrocarbon medium, for example benzene, toluene and xylene, at temperatures up to and including the reflux temperature. The progress of the reaction can be measured by the evolution of carbon dioxide.

The enamines used as starting materials in the process of this invention are known chemical compounds described with methods for their preparation in Organic Synthesis, vol. 41, p. 65 (1961) and in the Journal of the American Chemical Society, vol. 76, p. 2029 (1954). Other enamines, for example the enamines with condensed rings, such as β-decanolenamines, can also be used in the practice of the invention.

Further details of the novel procedure and compounds prepared thereby are described in the following specific examples.

EXAMPLE 1

A reaction flask was charged with 70 ml. of benzene, 8.25 grams of trichloroacetic acid and 8.35 grams of an enamine of the formula

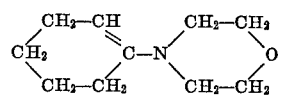

The mixture was refluxed for 30 minutes and heating was continued until there was no further evolution of carbon dioxide. The product recovered was found to have the formula

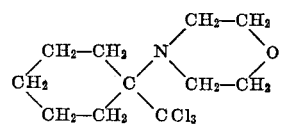

EXAMPLE 2

About 7.7 grams of an enamine of the formula

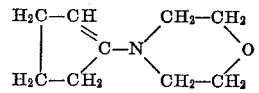

were added to 70 ml. of refluxing benzene. Trichloroacetic acid (8.25 grams) dissolved in 40 ml. of benzene was added to the refluxing mixture over a period of 30 minutes. After the $CO_2$ evolution ceased the heating was continued one hour. The solvent was evaporated under reduced pressure to recover an oil which crystallized upon standing. A recrystallization from aqueous acetone produced pure crystals (M.P. 64–65° C.) of a compound of the formula

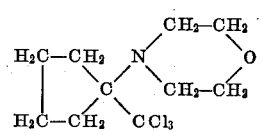

EXAMPLE 3

The enamine

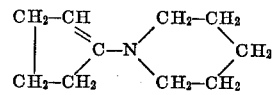

was refluxed in a benzene solution by the procedure of Example 2. The reaction with trichloroacetic acid produced a compound of the formula

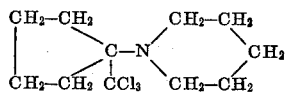

EXAMPLE 4

The reaction between the enamine

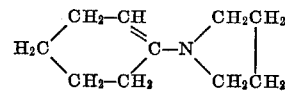

and trichloroacetic acid by the procedure of Example 1 produced a compound of the structure

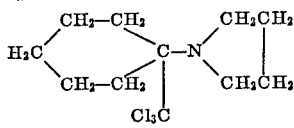

EXAMPLE 5

Using the procedure of Example 1 the enamine

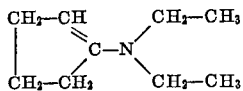

was reacted with trichloroacetic acid in toluene at reflux temperature. The resulting product was of the formula

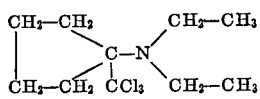

EXAMPLE 6

Using the procedure of Example 2 an enamine of the formula

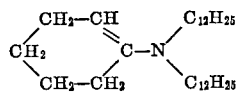

was heated with a stoichiometric proportion of trichloroacetic acid in o-xylene. The resulting product had the formula

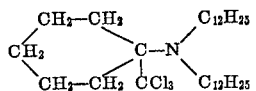

EXAMPLE 7

Stoichiometric proportions of trichloroacetic acid and an enamine of the formula

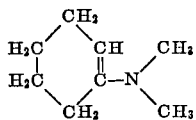

were heated at reflux in benzene. The resulting product was extracted from the reaction mixture with benzene. The desired compound was recrystallized from ethanol and identified as that having the formula

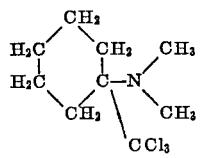

EXAMPLE 8

An enamine of the formula

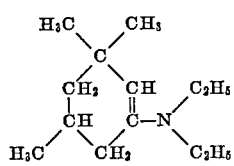

was heated in toluene at the reflux temperature with a stoichiometric proportion of trichloroacetic acid. The compound of the following formula was prepared:

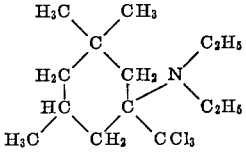

I claim:
1. A compound of the formula

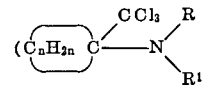

wherein $n$ is an integer of from three to five providing a hydrocarbon ring of the class consisting of alicyclic rings and said alicyclic rings having up to three methyl substituents; and wherein R and $R^1$ are selected from the class consisting of alkyl of up to 12 carbon atoms and such that R and $R^1$ together form a divalent aliphatic moiety of the class consisting of —$CH_2CH_2CH_2$—,

—$CH_2CH_2OCH_2CH_2$—, —$CH_2CH_2CH_2CH_2$—, $CH_2(CH_2)_3CH_2$—, and —$CH_2(CH_2)_4CH_2$—.

2. The compound of claim 1 wherein $n$ is 4 and R and R' together is —$CH_2CH_2OCH_2CH_2$—.
3. The compound of claim 1 wherein $n$ is 5 and R and R' together is —$CH_2CH_2OCH_2CH_2$—.
4. The compound of claim 1 wherein $n$ is 5 and R and R' together is —$CH_2CH_2CH_2CH_2$—.
5. The compound of claim 1 wherein $n$ is 4 and R and R' together is —$CH_2CH_2CH_2CH_2$—.
6. The compound of claim 1 wherein $n$ is 5 and each of R and R' is methyl.
7. A method of preparing compounds of the formula

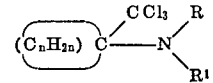

wherein $n$ is an integer of from three to five providing a hydrocarbon ring of the class consisting of alicyclic rings and said alicyclic rings having up to three methyl substituents; and wherein R and $R^1$ are selected from the class consisting of alkyl of up to 12 carbon atoms and such that R and $R^1$ together form a divalent aliphatic moiety of the class consisting of —$CH_2CH_2CH_2$—,

—$CH_2CH_2OCH_2CH_2$—, —$CH_2CH_2CH_2CH_2$—

—$CH_2(CH_2)_3CH_2$— and —$CH_2(CH_2)_4CH_2$—; which comprises reacting a compound of the formula

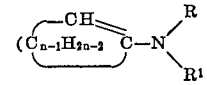

with a trichloroacetic acid.

8. The method of claim 7 wherein $n$ is 4 and R and R' together is —$CH_2CH_2OCH_2CH_2$—.
9. The method of claim 6 wherein $n$ is 5 and R and R' together is —$CH_2CH_2OCH_2CH_2$—.

No references cited.

ALEX MAZEL, Primary Examiner
J. TOVAR, Assistant Examiner

U.S. Cl. X.R.
260—293, 326.8, 563